(12) United States Patent
Low et al.

(10) Patent No.: US 11,830,305 B2
(45) Date of Patent: Nov. 28, 2023

(54) SYSTEMS AND METHODS FOR DYNAMIC CONTACTLESS SMART LOCKERS

(71) Applicant: Verizon Patent and Licensing Inc., Basking Ridge, NJ (US)

(72) Inventors: Mun Wei Low, Irving, TX (US); Warren Hojilla Uy, Randolph, NJ (US); Manuel Enrique Caceres, Basking Ridge, NJ (US); Dayong He, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 333 days.

(21) Appl. No.: 17/233,938

(22) Filed: Apr. 19, 2021

(65) Prior Publication Data

US 2022/0335760 A1     Oct. 20, 2022

(51) Int. Cl.
*G07C 9/00* (2020.01)
*G06K 19/07* (2006.01)
*H04L 9/08* (2006.01)
*G06Q 10/0836* (2023.01)

(52) U.S. Cl.
CPC ..... *G07C 9/00714* (2013.01); *G06K 19/0723* (2013.01); *G06Q 10/0836* (2013.01); *G07C 9/00896* (2013.01); *H04L 9/0825* (2013.01); *G07C 2009/00388* (2013.01); *G07C 2009/00412* (2013.01); *G07C 2009/00436* (2013.01)

(58) Field of Classification Search
CPC ............ G07C 9/00714; G07C 9/00896; G07C 2009/00388; G07C 2009/00412; G07C 2009/00436
See application file for complete search history.

(56) References Cited

U.S. PATENT DOCUMENTS

| | | | |
|---|---|---|---|
| 2011/0087370 A1* | 4/2011 | Denison | G07C 9/27 221/9 |
| 2014/0258168 A1* | 9/2014 | Crawford | G06Q 10/0836 705/339 |
| 2017/0091710 A1* | 3/2017 | Van Dyke | G06Q 10/0835 |
| 2018/0089917 A1* | 3/2018 | Obaidi | G06F 18/22 |
| 2020/0286315 A1* | 9/2020 | Mehrotra | G07C 9/00912 |

* cited by examiner

*Primary Examiner* — Nabil H Syed

(57) ABSTRACT

A system described herein may provide for the dynamic and secure assignment of lockers that may be used when delivering goods in response to a fulfillment request. In some embodiments, smart tags may be used for packages provided in response to a fulfillment request. A smart locker system of some embodiments may include a set of lockers and one or more scanners that identify goods that have been delivered into a particular locker, such as by scanning smart tags placed on or in packages. The smart locker system may further receive a request from a User Equipment ("UE"), via a contactless tap, to provide the delivered goods, authenticate the UE, locate the particular locker in which the delivered goods are located, and unlock the locker.

20 Claims, 11 Drawing Sheets

SYSTEMS AND METHODS FOR DYNAMIC CONTACTLESS SMART LOCKERS

BACKGROUND

Fulfillment centers may deliver goods using shippers, couriers, or the like. Some fulfillment centers may utilize intermediary techniques, such as post office boxes, lockers, or other techniques in which goods are delivered to a common location.

DETAILED DESCRIPTION OF EXAMPLE EMBODIMENTS

Figure 1:
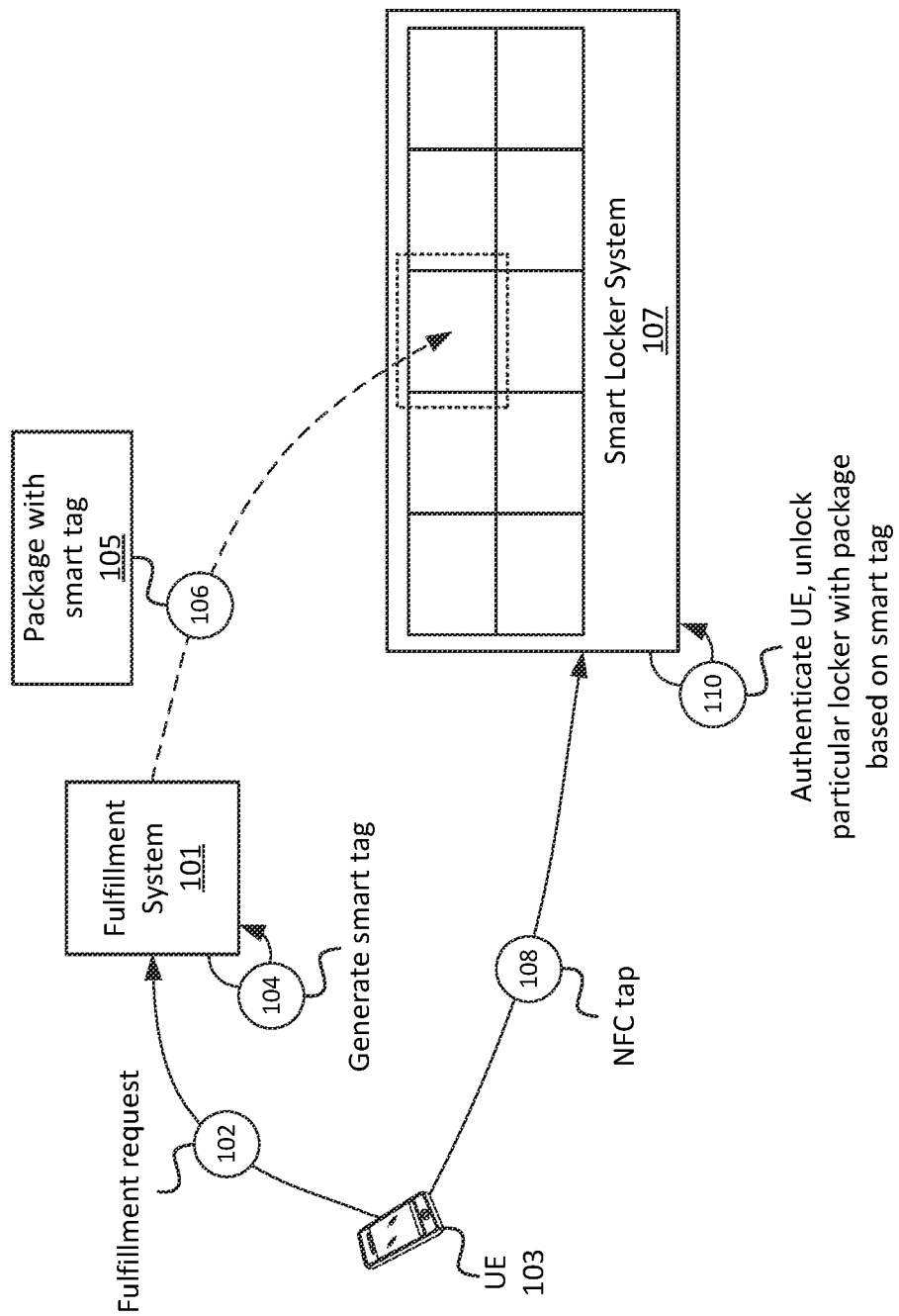
FIG. 1 illustrates an example overview of one or more embodiments described herein.

The following detailed description refers to the accompanying drawings. The same reference numbers in different drawings may identify the same or similar elements.

Embodiments described herein provide for the dynamic and secure assignment of lockers that may be used when delivering goods in response to a fulfillment request. In some embodiments, smart tags (e.g., Near Field Communication ("NFC") tags, Bluetooth Low Energy ("BLE") beacons, or the like) may be used for packages containing delivered, shipped, couriered, etc. goods that have been provided in response to a fulfillment request. In some embodiments, a particular fulfillment request may be associated with one or more User Equipment ("UEs"), such as mobile telephones, tablets, etc. that have initiated the fulfillment request and/or are authorized to receive delivery of such goods. A smart locker system of some embodiments may include a set of lockers and one or more scanners or other suitable devices that identify goods that have been delivered into a particular locker, such as by scanning smart tags placed on or in packages. The smart locker system may further receive a request from a UE, via a contactless communication such as an NFC tap or other suitable communication pathway, to provide the delivered goods, may authenticate the UE, locate the particular locker in which the delivered goods are located, and unlock the locker.

In this manner, no user interaction is required at the time that the delivered goods are placed into the particular locker, indicating a particular locker in which the goods have been placed. Further, the locker may be selected dynamically at the time of placement into the locker. As such, the potential for human error of a courier or other individual placing the goods into the locker is reduced or eliminated. For example, situations where the goods are placed in one locker and are errantly indicated as being placed in a different locker, and/or where a particular locker is selected for the goods and the goods are placed in a different locker, may be avoided. Further, the process of delivering goods into smart lockers may be streamlined, as no time or resources may be required for a courier or other individual to specify in which locker the goods have been placed, and/or to identify a previously selected locker in which to place the goods. Additionally, in situations where the goods are delivered by an autonomous drone or other automated system, such system need not be configured to interact with the smart locker system to indicate a particular locker in which the goods have been placed. Further, the smart locker system of some embodiments may be owned and/or operated independently of any particular source of goods that are delivered to and/or placed inside the lockers. Accordingly, the use the such smart locker system may be scalable and adaptable, such that any suitable source, shipper, courier, etc. of goods may utilize the smart locker system of some embodiments without needing to configure or track parameters relating to any particular locker in which such goods are delivered. The user experience of an individual receiving the goods may also be enhanced, as the likelihood of an error-free delivery may be increased in accordance with some embodiments.

As shown in FIG. 1, for example, fulfillment system 101 may receive (at 102) a fulfillment request from UE 103. The fulfillment request may be, may include, and/or may otherwise be associated with an order or request for one or more goods, products, items, etc. In some embodiments, fulfillment system 101 may include and/or may be communicatively coupled to a website, a web portal, an application server, and/or some other type of network-accessible resource with which UE 103 may communicate.

Based on the fulfillment request, fulfillment system 101 may generate a smart tag. The smart tag may be and/or may include an NFC tag, a BLE beacon, a label with a Quick Response ("QR") code, and/or some other sort of device, component, or other type of physical object on which information may be encoded. Fulfillment system 101 may further provide (at 106) package 105 with the smart tag to smart locker system 107. The dashed lines in this figure and in subsequent figures are used to indicate the providing of physical goods, such as package 105, in response to a fulfillment request. For example, the fulfillment request may include an order for a product, and package 105 may include the ordered product. For example, the product may have been placed inside package 105 at a fulfillment center, warehouse, etc. by an individual, an automated packing system, etc.

Package 105 may be placed in a particular locker of smart locker system 107, which may include multiple (e.g., 2, 10, 20, 100, etc.) lockers. As noted above, when package 105 is placed in the particular locker (e.g., by a courier, shipper, autonomous delivery system, etc.), smart locker system 107 may automatically detect which locker package 105 has been placed in. For example, as discussed below, smart locker system 107 may include one or more scanners, readers, or the like, which may detect the smart tag included in or on package 105, and may identify the particular locker based on such detection. Further, as discussed below, smart locker system 107 may generate or otherwise associate package 105 and/or the particular locker with one or more keys or other security mechanisms, and may automatically lock the particular locker based on such keys or other security mechanisms.

Subsequently, UE 103 may interact (at 108) with smart locker system 107, such as via an NFC tap, a BLE communication, a QR code scan, or the like. For example, as discussed below, UE 103 may receive an indication (e.g., from smart locker system 107, fulfillment system 101, and/or some other suitable device or system) that package 105 has been delivered to smart locker system 107. Smart locker system 107 may authenticate (at 110) UE 103 based on the interaction, and may unlock the particular locker in which package 105 is located based on authenticating UE 103. In some embodiments, the interaction and authentication (at 108 and/or 110) may include the instantiating, downloading, activating, utilizing, etc. of an application, application programming interface ("API"), an "instant app" or "app clip," or some other suitable communication pathway. For example, as discussed below, smart locker system 107 may provide (e.g., via contactless interaction, such as an NFC tap, QR code scan, etc.) an instruction, callback Uniform Resource Locator ("URL"), and/or other suitable information to cause UE 103 to download, utilize, etc. a particular application, "instant app," "app clip," or the like via which smart locker 107 may communicate with UE 103 (e.g., to authenticate UE 103). As referred to herein, an "app clip" or "instant app" may refer to an application or portion thereof which may be executed by UE 103 without performing a full installation process. "App clips," "instant apps," or the like may be supported or implemented by a respective operating system associated with UE 103. Further examples of the interaction and/or authentication (at 108 and/or 110), in accordance with some embodiments, are provided below.

For example, as shown in FIG. 2, UE 103 may output (at 202) a fulfillment request to fulfillment system 101. As noted above, the fulfillment request (at 202) may be or may include an order for a product or goods, or other type of request for physical goods. In some embodiments, the fulfillment request may specify a particular geographical location, address, etc. associated with particular smart locker system 107 to which the goods should be sent. For example, fulfillment system 101 may be associated with a network of smart locker systems 107, which may be deployed in a geographically distributed manner among various cities, provinces, states, or other types of regions, and UE 103 may specify a particular smart locker system 107, out of the network of available smart locker systems 107, or location to which the goods should be sent.

In some embodiments, the fulfillment request may include an identifier associated with UE 103, such as a Mobile Directory Number ("MDN"), an Internet Protocol ("IP") address, a device name, and/or some other sort of suitable device identifier. In some embodiments, the fulfillment request may include a user identifier, an email address, and/or some other sort of identifier of a user associated with the fulfillment request. In some embodiments, the fulfillment request may specify a particular UE 103 or other type of identifier (e.g., an MDN of a particular UE 103 and/or some other identifier of another UE 103, an email address, and/or some other identifier via which a given user or UE 103 may be contacted). For example, a user placing the fulfillment request may specify an MDN associated with a UE 103 belonging to an individual who is authorized to pick up the package from smart locker system 107, which may be a different UE 103 and/or individual than from which the fulfillment request is received.

Fulfillment system 101 may generate (at 204) a fulfillment tag with a package identifier ("PKG_ID"). For example, fulfillment system 101 may include and/or may be communicatively coupled to an encoder, printer, or other type of device or system that is capable of generating a smart tag that is encoded with the PKG_ID. For example, fulfillment system 101 may include and/or may be communicatively coupled to an NFC encoder, a BLE encoder, a printer that is capable of printing visual graphics and/or characters on paper or labels, or other suitable encoder or printer. The PKG_ID may be unique to the fulfillment request, such that other fulfillment requests associated with the same UE 103 and/or different UEs 103 may be associated with different PKG_IDs. In some embodiments, the PKG_ID may include and/or may be based on a "tracking" number which may be used by a shipper or courier to track the progress of the shipment and/or delivery of the requested goods. In some embodiments, the PKG_ID may be distinct and/or independent of such "tracking" number. In some embodiments, the PKG_ID may include, may be derived from, and/or may otherwise indicate an application identifier, an app clip identifier, an instant app identifier, and/or a locator or link (e.g., a callback URL or other type of locator) identifying a resource from which such application, app clip, or instant app may be obtained. Such identifier may be associated with an application which may be downloaded, executed, etc. by UE 103 in order to communicate with authentication relay system 201, as described below.

In some embodiments, the PKG_ID may be "public" information, unencrypted information, and/or otherwise not "secret" information. For example, the PKG_ID may be "visible" to any device or system with a suitable detection system, such as an image recognition system that is capable of identifying visual patterns, QR codes, designs, characters, or the like that may be visually displayed by (e.g., printed on) the smart tag. As another example, the PKG_ID may be able to be detected by an NFC reader or scanner that is capable of identifying information encoded on an NFC tag (e.g., in embodiments where the smart tag is, or includes, an NFC tag). As another example, the PKG_ID may be able to be detected by a BLE reader or scanner that is capable of identifying information encoded on a BLE beacon (e.g., in embodiments where the smart tag is or includes a BLE beacon).

In some embodiments, fulfillment system 101 may include and/or may be communicatively coupled to a device or system (e.g., an automated system) that affixes the smart tag to a package that may be used to deliver the goods that are the subject of the fulfillment request, and/or which places the smart tag inside the package. For example, the smart tag may include an adhesive, which may adhere the smart tag to a surface of the package. As another example, the smart tag may be or include a radio frequency ("RF") beacon, such as a BLE beacon, that fulfillment system 101 may place inside the package. In some embodiments, some other device or system may affix the smart tag to the package and/or place the smart tag inside the package.

Fulfillment system 101 may further output (at 206) an indication that UE 103 is associated with the PKG_ID generated in response to the fulfillment request. For example, fulfillment system 101 may indicate an MDN of UE 103 (and/or of some other UE 103 specified in the fulfillment request) and/or other suitable identifier via which UE 103 may be communicated with or identified. Authentication relay system 201 may maintain association information that associates UE 103 with the PKG_ID, such that authentication relay system 201 may subsequently notify UE 103 in accordance with, for example, example operations described below. In this manner, details regarding UE 103 may not need to be provided to smart locker system 107 (e.g., via the fulfillment tag), thus enhancing the security and privacy of UE 103. For example, although only a particular UE 103 may be authorized to retrieve the package, details regarding such UE 103 may not need to ever be provided to smart locker system 107, and/or may not be accessible to a malicious actor who may scan, read, etc. the smart tag.

In some embodiments, authentication relay system 201 and fulfillment system 101 may communicate via one or more APIs or other suitable communication pathways. In some embodiments, authentication relay system 201 and fulfillment system 101 may be implemented by the same device or system. In some embodiments, authentication relay system 201 and fulfillment system 101 may be implemented by different devices or systems that communicate via one or more networks. In some embodiments, authentication relay system 201 and smart locker system 107 may be implemented by the same device or system. In some embodiments, authentication relay system 201 and smart locker system 107 may be implemented by different devices or systems that communicate via one or more networks.

Fulfillment system 101 may further provide (at 208) the fulfillment tag with the PKG_ID to smart locker system 107. For example, fulfillment system 101 may provide the package with the goods provided in response to the fulfillment request via a courier, shipping service, autonomous delivery drone, or other suitable technique. As noted above, the package may have the fulfillment tag affixed to an exterior of the package, or the fulfillment tag may be included inside the package. Smart locker system 107 may include multiple lockers, inside which the package may be placed by a courier, shipper, drone or other automated machine or device, or the like.

Figure 3:
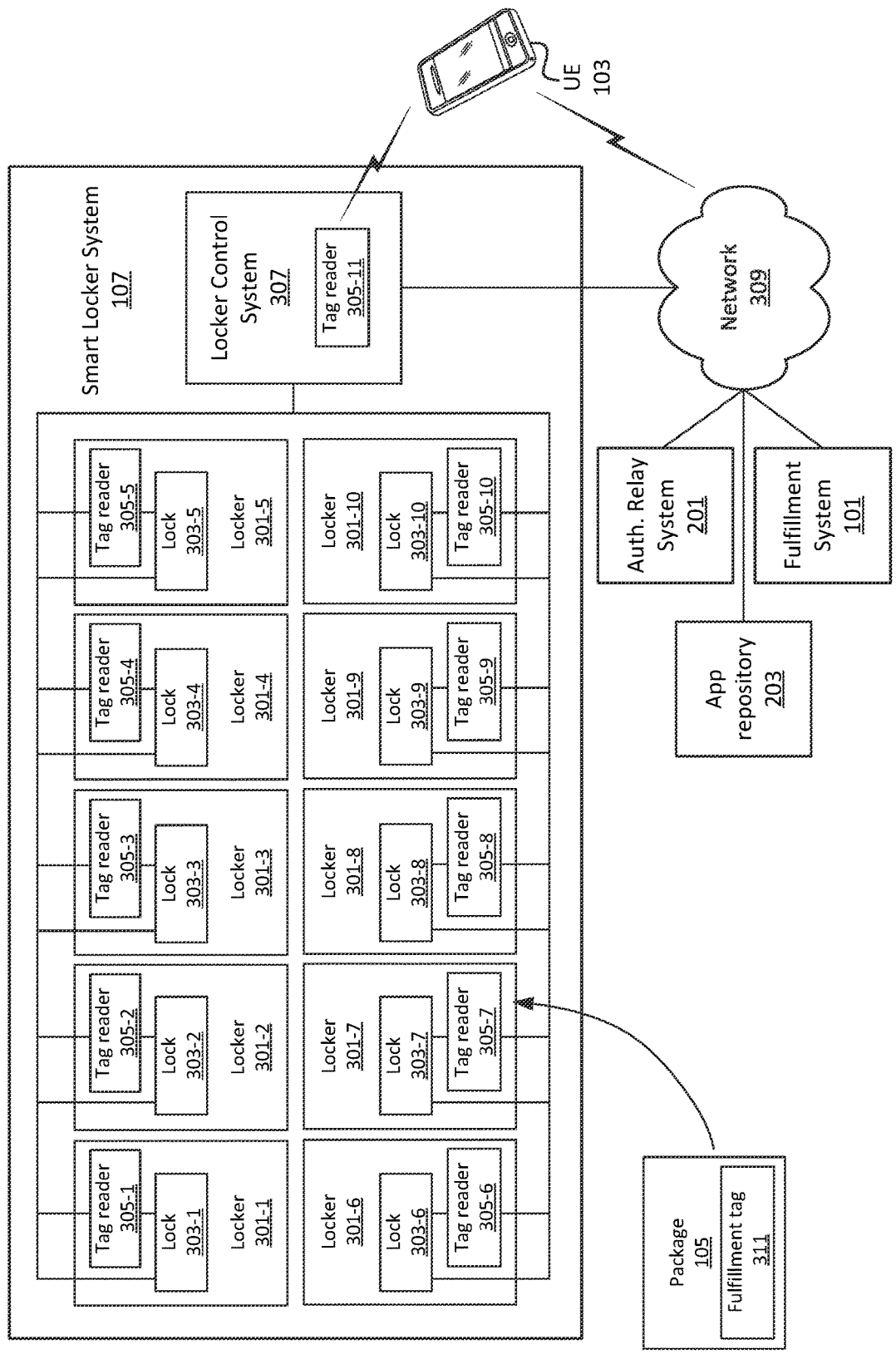
FIG. 3 illustrates an example environment in which one or more embodiments, described herein, may be implemented.

For example, as shown in FIG. 3, smart locker system 107 may include a set of lockers 301 (e.g., lockers 301-1 through 303-10). Each locker 301 may be associated with a respective lock 303 and tag reader 305. Lock 303 and tag reader 305, respectively associated with each locker 301, may be communicatively coupled to locker control system 307. Further, each locker 301 may be associated with a particular locker identifier ("LKR_ID"), which may uniquely identify each locker 301.

Locker control system 307 may further be communicatively coupled to one or more networks, such as network 309. Network 309 may include and/or may be communicatively coupled to the Internet and/or one or more other networks. In some embodiments, network 309 may include and/or may be communicatively coupled to a radio access network ("RAN") of a wireless network, and may include a Long-Term Evolution ("LTE") RAN, a Fifth Generation ("5G") RAN, and/or some other type of RAN. In some embodiments, locker control system 307 may communicate with fulfillment system 101 and/or authentication relay system 201 via network 309. In some embodiments, fulfillment system 101 and authentication relay system 201 may communicate with each other and/or one or more other devices or systems via network 309.

As shown, package 105, which may include fulfillment tag 311 (e.g., affixed on an exterior of package 105 and/or located inside package 105), may be placed inside a particular locker 301 (e.g., locker 301-7, in this example). Locker 301 may include lock 303, which may be locked when package 105 is placed inside locker 301. For example, lock 303 may be manually locked when package 105 is placed inside locker 301, and/or may automatically lock when package 105 is placed inside locker 301. For example, locker 301 may include one or more sensors (e.g., motion sensors, scales, accelerometers, and/or other types of sensors) that detect when a package has been placed inside locker 301. Additionally, or alternatively, tag reader 305, associated with locker 301, may scan, read, etc. (herein referred to simply as "scanning") fulfillment tag 311 and may provide an instruction or other information to lock 303 based on scanning fulfillment tag 311. For example, tag reader 305 may provide a "lock" instruction to lock 303, based on which lock 303 may actuate one or more locking mechanisms, thus locking locker 301. Locker 301 and/or lock 303 may further output a notification to locker control system 307, indicating that lock 303 was locked.

In some embodiments, tag reader 305 may scan fulfillment tag 311 and provide an indication to locker control system 307 of the scanned fulfillment tag 311. For example, tag reader 305 may output information encoded in fulfillment tag 311 and determined based on the scanning, such as a PKG_ID encoded in fulfillment tag 311 and/or other suitable information. Tag reader 305 may further output an identifier of a particular locker 301 with which tag reader 305 is associated (e.g., a LKR_ID associated with locker 301). In some embodiments, locker control system 307 may issue a command, instruction, etc. to lock 303, associated with locker 301, to lock locker 301 based on receiving the indication that package 105 was received in locker 301 (e.g., based on the notification from tag reader 305). In this manner, locker control system 307 may maintain information regarding which lockers 301 have been locked and/or are unlocked, and further may maintain information associating particular lockers 301 (e.g., LKR_IDs) to particular packages 105 and/or fulfillment tags 311 (e.g., PKG_IDs). In some embodiments, as discussed below, locker control system 307 may perform one or more other functions, such as generating authentication keys, validating authentication keys, issuing unlock commands, etc.

Returning to FIG. 2A, smart locker system 107 may identify (at 210) a LKR_ID (e.g., associated with a respective locker 301) associated with the received (at 208) package and/or fulfillment tag (e.g., package 105 and/or fulfillment tag 311), generate an authentication key ("KEY"), associate the received package and/or fulfillment tag with the particular LKR_ID, and lock the locker. For example, as similarly described above, locker control system 307 may receive an indication from the particular locker 301 (e.g., from lock 303, tag reader 305, and/or some other component or device associated with locker 301) that the package and/or fulfillment tag has been placed in the particular locker 301.

Smart locker system 107 may further generate a KEY, which may be used to unlock locker 301 at a later time. For example, smart locker system 107 may generate a code, alphanumeric string, QR code, passphrase, or the like, which may be used to unlock locker 301. Additionally, or alternatively, smart locker system 107 may generate or select an asymmetric key pair, where the KEY in this figure refers to a private key of the asymmetric key pair. In some embodiments, the KEY may be any suitable authentication mechanism by which a recipient of the KEY (e.g., UE 103, as described herein) may use the KEY at a subsequent time to verify that such recipient is authorized to unlock locker 301, in which package 105 and/or fulfillment tag 311 are located. In some embodiments, the KEY may include and/or may be associated with the LKR_ID. For example, a public key may be used to encrypt information including the LKR_ID, and the KEY may include a private key that may be used to decrypt the information encrypted using the public key. As another example, the KEY may be or may include a code, passphrase, or the like, and smart locker system 107 may store information indicating that the KEY is associated with the particular LKR_ID. As such, the term "KEY," as used herein, may refer to any suitable authentication mechanism, or portion thereof, which may be used in accordance with one or more authentication techniques described herein. Smart locker system 107 may further provide (at 212) the KEY along with the PKG_ID to authentication relay system 201.

In some embodiments, once generated, the KEY itself may not be stored locally by smart locker system 107. For example, in some embodiments, smart locker system 107 may communicate with one or more external systems to generate the KEY, in which the one or more external systems may provide a public key (e.g., a public key of an asymmetric key pair) to smart locker system 107 and may provide the KEY (e.g., a private key of the asymmetric key pair) to authentication relay system 201, a blockchain, or other device or system. For example, smart locker system 107 may provide an IP address and/or other information associated with authentication relay system 201 with which the one or more external systems may communicate, and may also provide the PKG_ID. The one or more external systems may provide the public key to smart locker system 107 (e.g., along with the PKG_ID), and may provide (e.g., in addition to, or in lieu of, arrow 212) the KEY (e.g., the private key) to authentication relay system 201 along with the PKG_ID. Additionally, or alternatively, smart locker system 107 and/or the one or more other systems may record the KEY to a block of a blockchain system, and may provide (e.g., in conjunction with the PKG_ID) a block identifier, a transaction identifier, a transaction hash, or other indication of how to retrieve the KEY from the blockchain system. In this manner, the KEY may be decoupled from and/or anonymous with respect to UE 103, thus preserving the privacy and security of UE 103.

Authentication relay system 201 may further identify (at 214) UE 103 based on the PKG_ID accompanying the KEY (as received at 212). For example, authentication relay system 201 may identify UE 103 based on the information associating the PKG_ID and UE 103 (as received at 206). Authentication relay system 201 may further output (at 216) the KEY and a notification that package 105 and/or fulfillment tag 311, associated with the PKG_ID, has been received by smart locker system 107. For example, the KEY may be provided to an API, application (e.g., an "app clip," "instant app," and/or some other suitable application via which UE 103 and authentication relay system 201 communicate), or the like executing at UE 103. The notification may be provided via an API, a text message, an email, and/or other suitable communication pathway. Based on receiving the notification (at 216), UE 103 may present a visual notification, an audible notification, and/or some other type of notification to indicate (e.g., to a user of UE 103) that package 105 is available to be picked up from smart locker system 107.

UE 103 may subsequently provide (at 218) the KEY to smart locker system 107, in order to unlock the particular locker in which package 105 is located. For example, referring to FIG. 3, UE 103 may communicate with tag reader 305-11, associated with locker control system 307, via NFC, BLE, and/or some other sort of RF communication, to provide the KEY to locker control system 307. Additionally, or alternatively, UE 103 may display a QR code or other visual code that includes and/or that represents the KEY, and locker control system 307 may include and/or may be communicatively coupled to an optical scanner (e.g., a camera or other type of sensor that is capable of scanning visual information) that reads the KEY from UE 103. Additionally, or alternatively, locker control system 307 may include a touchpad, touchscreen, keyboard, and/or other type of input device via which a user of UE 103 may input the KEY and/or some value representing the KEY. As noted above, operation 218 in FIG. 4 may include some or all of the operations described above with respect to FIG. 2B (e.g., the obtaining and/or use of an app clip, instant app, application, etc. to authenticate UE 103 and/or a user thereof).

Based on receiving (at 218) the KEY, smart locker system 107 may validate (at 220) the KEY, identify the LKR_ID based on the KEY, and unlock the particular locker in which package 105 is located. For example, in some embodiments, smart locker system 107 may generate an authentication token and/or authentication challenge (e.g., a randomly generated string or phrase, a string or phrase selected from a pool, a pre-set string or phrase, a randomly generated image or pattern, an image or pattern selected from a pool, a pre-set image or pattern, or other suitable authentication challenge information), and may encrypt the authentication challenge based on the key. In some embodiments, the authentication challenge may be or may include the LKR_ID. Smart locker system 107 may encrypt the authentication token or challenge using the public key of the asymmetric key pair, UE 103 may decrypt the authentication token using the private key of the asymmetric key pair, and may provide a challenge response that includes the decrypted information. Smart locker system 107 may validate the KEY (at 220) by verifying that the received challenge response (e.g., based on UE 103 decrypting the challenge using the private key) matches the unencrypted version of the authentication token or challenge (e.g., prior to the encryption of such token or challenge).

As another example, smart locker system 107 may receive the KEY itself from UE 103 and may validate the KEY by using the KEY to decrypt information that was encrypted using one or more public keys (e.g., one or more authentication tokens or other suitable authentication information). In some embodiments, smart locker system 107 may maintain multiple such instances of information encrypted using multiple public keys, and may attempt to decrypt some or all of these instances of encrypted information. The KEY may be validated when the KEY successfully decrypts a particular instance of encrypted information, which may include and/or may otherwise be associated with the LKR_ID of the particular locker in which package 105 is located. In some embodiments, smart locker system 107 may validate the KEY by comparing the KEY to a previously stored KEY (e.g., stored locally at smart locker system 107, and/or stored in a blockchain or other remote system).

Based on validating the KEY, smart locker system 107 may unlock the particular locker in which package 105 is located. For example, referring to FIG. 3, locker control system 307 may output a command, instruction, etc. to a particular lock 303 associated with the particular locker 301 associated with the LKR_ID, which may cause lock 303 to unlock. In some embodiments, locker control system 307 may present information indicating the particular locker 301 in which package 105 is located via display screen, speaker, or the like. In some embodiments, locker control system 307 may present such information to UE 103, such that UE 103 may present a notification of which particular locker 301 contains package 105. In this manner, a user of UE 103 may easily be able to identify the particular locker 301 in which package 105 is located, which may be useful in situations where smart locker system 107 includes numerous (e.g., dozens, hundreds, etc.) of lockers 301.

Figure 2A:
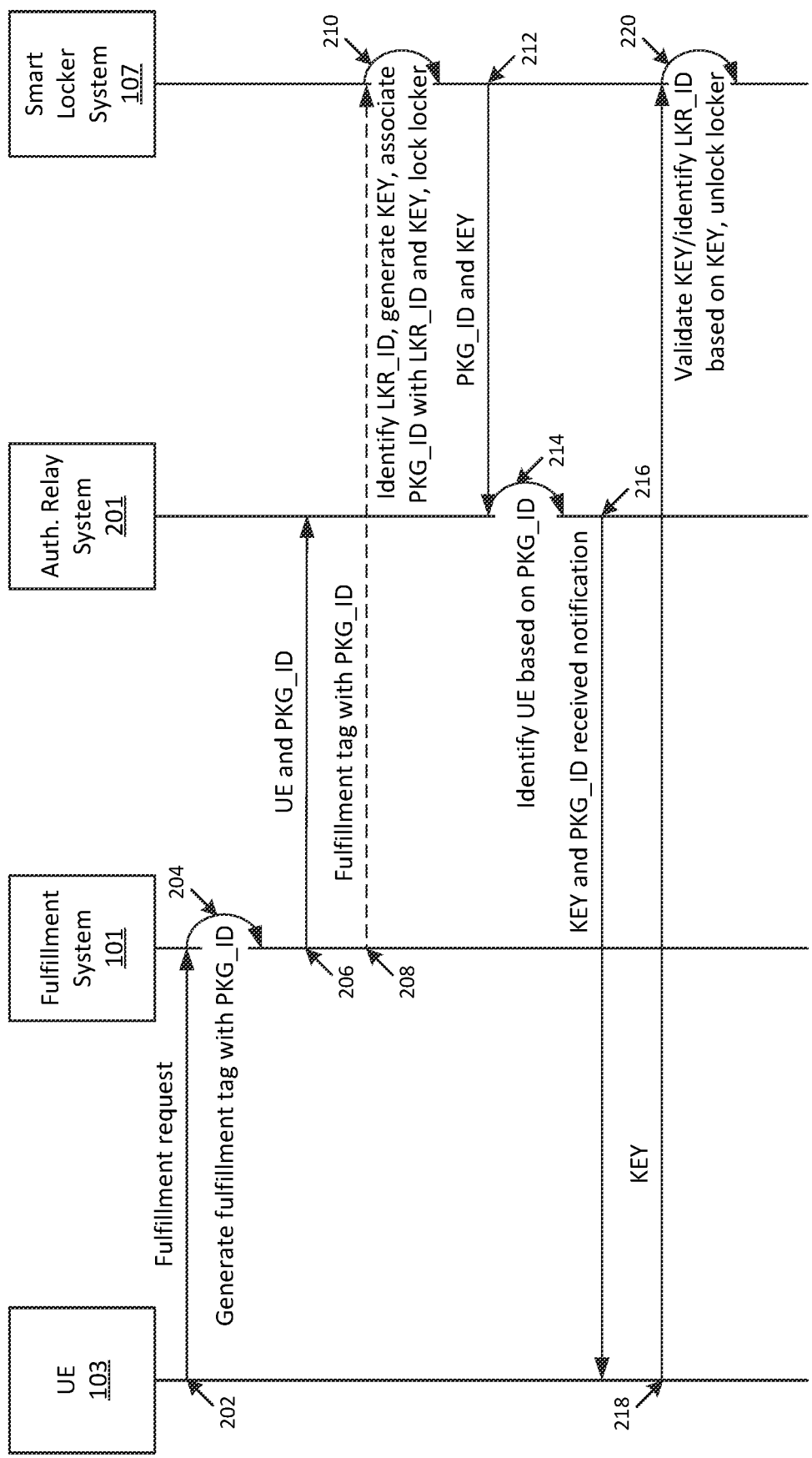
FIG. 2A illustrates an example of the secure delivery to, and retrieval from, a smart locker system in response to a fulfillment request, in accordance with some embodiments.

In accordance with the example process of FIG. 2A, anonymity of UE 103 and/or a user thereof may be preserved, as smart locker system 107 need not be notified of an identity of UE 103 and/or of the user. Further, ease and accuracy of delivery (e.g., by a courier, shipper, automated delivery device or system, etc.) may be enhanced, as a particular locker 301 may not need to be selected prior to delivery of package 105 into smart locker system 107.

Figure 2B:
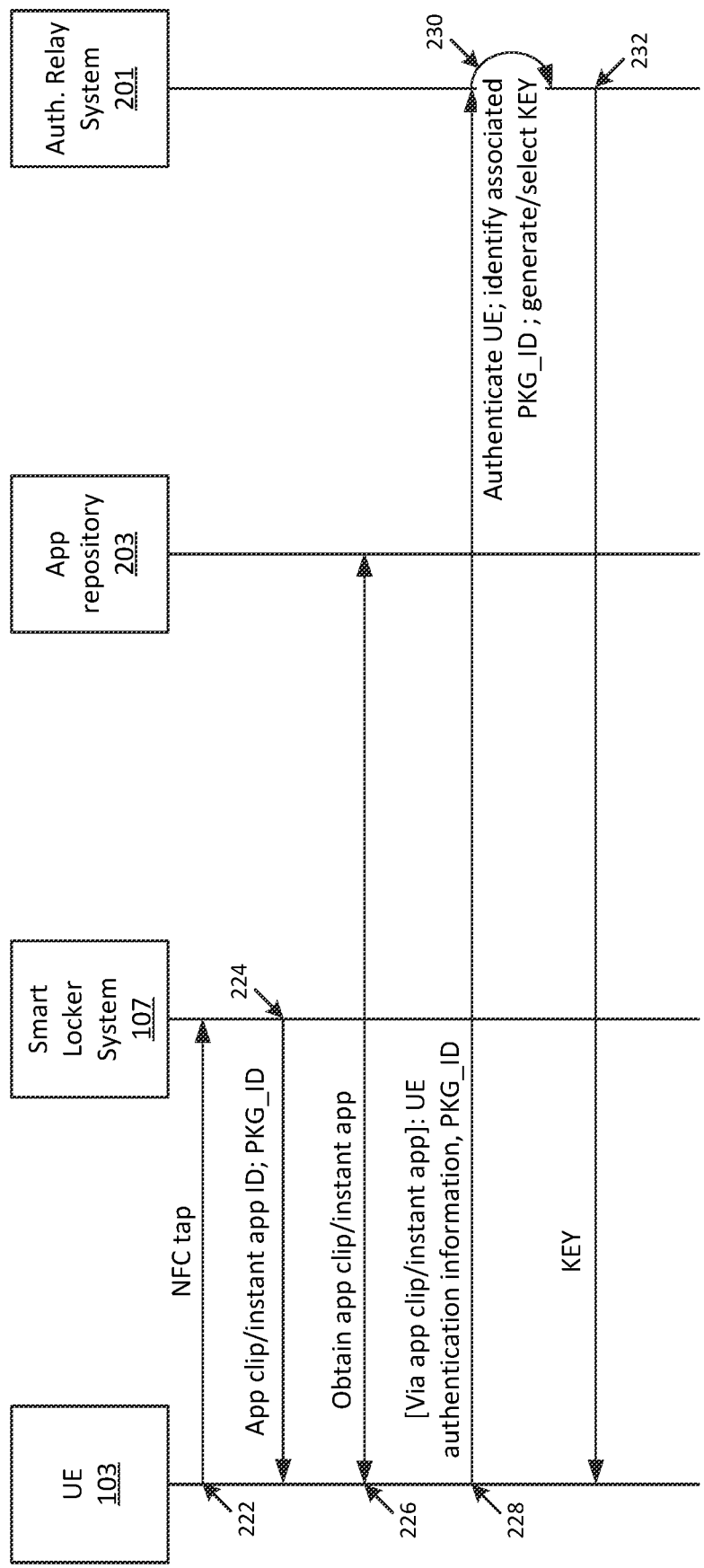
FIG. 2B illustrates an example of using an "app clip" or "instant app" in the retrieval from a smart locker system, in accordance with some embodiments.

FIG. 2B illustrates an example of operations that may be performed in lieu of, or in addition to, one or more of the operations shown in FIG. 2A. For example, as noted above with respect to FIG. 2A, UE 103 may provide (at 218) a KEY or other suitable authentication information to smart locker system 107 (e.g., a challenge response generated by UE 103 using a private key of an asymmetric key pair, and/or some other authentication information). As further noted above, the KEY may be provided via an API, application, app clip, instant app, etc. executing at UE 103. For example, as shown in FIG. 2B, UE 103 may communicate (at 222) with smart locker system 107 via an NFC tap. Additionally, or alternatively, UE 103 may scan a QR code, receive information via BLE communications, and/or otherwise scan or receive information from smart locker system 107.

For example, as a result of the NFC tap, QR code scan, BLE communications, or other suitable communications (at 222), UE 103 may receive (at 224) an identifier of an API, application, app clip, instant app, and/or other suitable communication pathway via which UE 103 may communication with authentication relay system 201. In this example, smart locker system 107 may provide an identifier of an app clip or instant app, a URL at which such app clip or instant app may be obtained, and/or other suitable information.

UE may obtain (at 226) the app clip, instant app, application, etc. from application repository 203, which may include a resource from which such app clips, instant apps, applications, etc. may be obtained. For example, UE 103 may determine, after receiving (at 224) the identifier of the app clip, instant app, application, etc. that such app clip, instant app, application, etc. is not available at UE 103. For example, in situations where the app clip, instant app, application, etc. has previously been utilized by UE 103, such app clip, instant app, application, etc. may be present in a cache or other type of memory device associated with UE 103. If, on the other hand, such app clip, instant app, application, etc. has not been previously used by UE 103, UE 103 may determine that such app clip, instant app, application, etc. should be obtained from application repository 203, which may be indicated or identified in the information received (at 224) from smart locker system 107.

UE 103 may further obtain (at 226) the app clip, instant app, application, etc. from application repository 203. For example, UE 103 may request the app clip, instant app, application, etc., may participate in one or more authentication procedures or other suitable procedures with application repository 203, and may receive the app clip, instant app, application, etc. UE 103 may further execute, instantiate, etc. the app clip, instant app, application, etc. In some embodiments, the app clip, instant app, application, etc. may be configured to communicate with authentication relay system 201. Accordingly, via the app clip, instant app, application, etc., UE 103 may communicate with authentication relay system 201 in order to obtain the KEY. For example, as noted above, authentication relay system 201 may have received the KEY (at 212) from smart locker system 107, and may maintain (at 214) information associating the particular KEY with the particular UE 103 and/or the particular PKG_ID. For example, the app clip, instant app, application, etc. may be configured to perform a biometric authentication of a user of UE 103 or some other suitable authentication procedure, and may indicate (at 228) that such authentication procedure has been performed. Additionally, or alternatively, UE 103 may provide (at 228) other suitable authentication information to authentication relay system 201, such that authentication relay system 201 is able to verify that UE 103 is authorized to receive the KEY for the particular PKG_ID.

Based on authenticating UE 103 and identifying the PKG_ID associated with UE 103, authentication relay system 201 may generate and/or select (at 230) a KEY associated with the particular PKG_ID. For example, as noted above, the KEY may include a private key of an asymmetric key pair or some other suitable type of authentication information. Authentication relay system 201 may further provide (at 232) the KEY to UE 103 (e.g., via the app clip, instant app, application, etc.).

UE 103 may proceed to provide the KEY to smart locker system 107, such as in the manner described above (at 218) with respect to FIG. 2A. As such, operation 218 (described above with respect to FIG. 2A) may include some or all of the communications (at 222 and 224) between UE 103 and smart locker system 107 described with respect to FIG. 2B.

Figure 4:
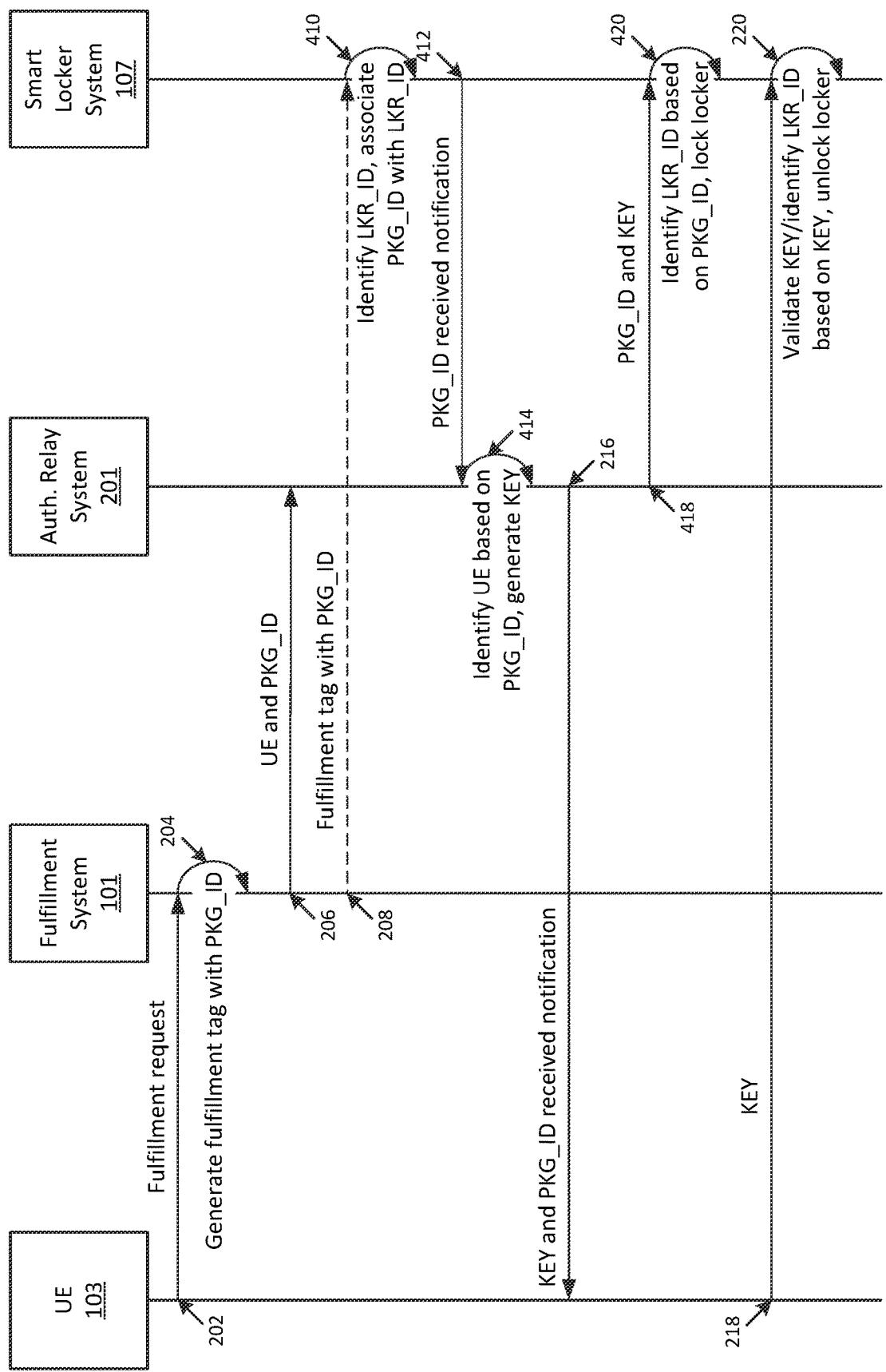
FIGS. 4-6 illustrate examples of the secure delivery to, and retrieval from, a smart locker system in response to a fulfillment request, in accordance with some embodiments.

FIG. 4 illustrates another example of the secure delivery to, and retrieval from, smart locker system 107 in response to a fulfillment request, in accordance with some embodiments. Some of the operations shown in FIG. 4 may be the same as, or similar to, operations shown in FIG. 2A. Such operations are numbered in FIG. 4 with the same reference numerals as used in FIG. 2A, and are not explained again for the sake of brevity. For example, as shown, UE 103 may output (at 202) a fulfillment request to fulfillment system 101, fulfillment system 101 may generate (at 204) a fulfillment tag with a PKG_ID, provide (at 206) UE information and the PKG_ID to authentication relay system 201, and provide (at 208) the fulfillment tag (e.g., inside or on a package) to smart locker system 107. Smart locker system 107 may identify (at 410) a LKR_ID of a particular locker in which the package was placed, and may associate the LKR_ID with the package (e.g., as similarly described above with respect to arrow 210).

Smart locker system 107 may further output (at 412) a notification to authentication relay system 201, indicating that the package associated with the PKG_ID was received at smart locker system 107. Authentication relay system 201 may identify (at 414) UE 103 based on the PKG_ID (e.g., as similarly described above with respect to arrow 214). In some embodiments, authentication relay system 201 may also generate (at 414) a KEY based on the receipt of the package. For example, as similarly described above with respect to arrow 210, authentication relay system 201 may generate or select an asymmetric key pair, a passphrase, and/or a key according to some other suitable authentication mechanism. In some embodiments, authentication relay system 201 may maintain the KEY locally, may write some or all of the key to a blockchain system, and/or may refrain from maintaining the key (e.g., after performing the operations described below with respect to arrows 416 and 417). Authentication relay system 201 may provide (at 216) the KEY to UE 103, in a manner similarly described above. For example, authentication relay system 201 may provide a private key of an asymmetric key pair, a block identifier or transaction identifier associated with a recording of the KEY (and/or information associated with the KEY) to a blockchain system, etc.

Authentication relay system 201 may also provide (at 418) the PKG_ID and the KEY to smart locker system 107. For example, authentication relay system 201 may provide (at 418) information that may be used by smart locker system 107 to validate the KEY, such as a public key associated with the same asymmetric key pair as the private key provided to UE 103, an authentication token encrypted with the private key, the KEY itself, and/or other suitable information to smart locker system 107. Smart locker system 107 may identify (at 420) the particular locker 301 (e.g., LKR_ID) in which package 105 and/or fulfillment tag 311 are located based on the PKG_ID included with the KEY (at 418). Smart locker system 107 may further lock the identified locker based on receiving (at 418) the KEY.

In some embodiments, smart locker system 107 may lock the locker prior to receiving the KEY, such as with a "default" or "native" authentication mechanism (e.g., an authentication mechanism that is independent of the KEY). In this manner, the lock may be locked once package 105 and/or fulfillment tag 311 are delivered to the locker, and may be unlocked by an administrator or other entity associated with smart locker system 107 in situations where the KEY is not received (e.g., when smart locker system 107 is waiting to receive the KEY, and/or when a communication error may have occurred between smart locker system 107 and authentication relay system 201 and no KEY has been received). UE 103 may subsequently provide (at 218) the KEY to smart locker system 107 (e.g., via NFC tap or other suitable mechanism as described above), and smart locker system 107 may validate (at 220) the KEY, identify the LKR_ID based on the KEY, and unlock the identified locker. As noted above, operation 218 in FIG. 4 may include some or all of the operations described above with respect to FIG. 2B (e.g., the obtaining and/or use of an app clip, instant app, application, etc. to authenticate UE 103 and/or a user thereof).

Figure 5:
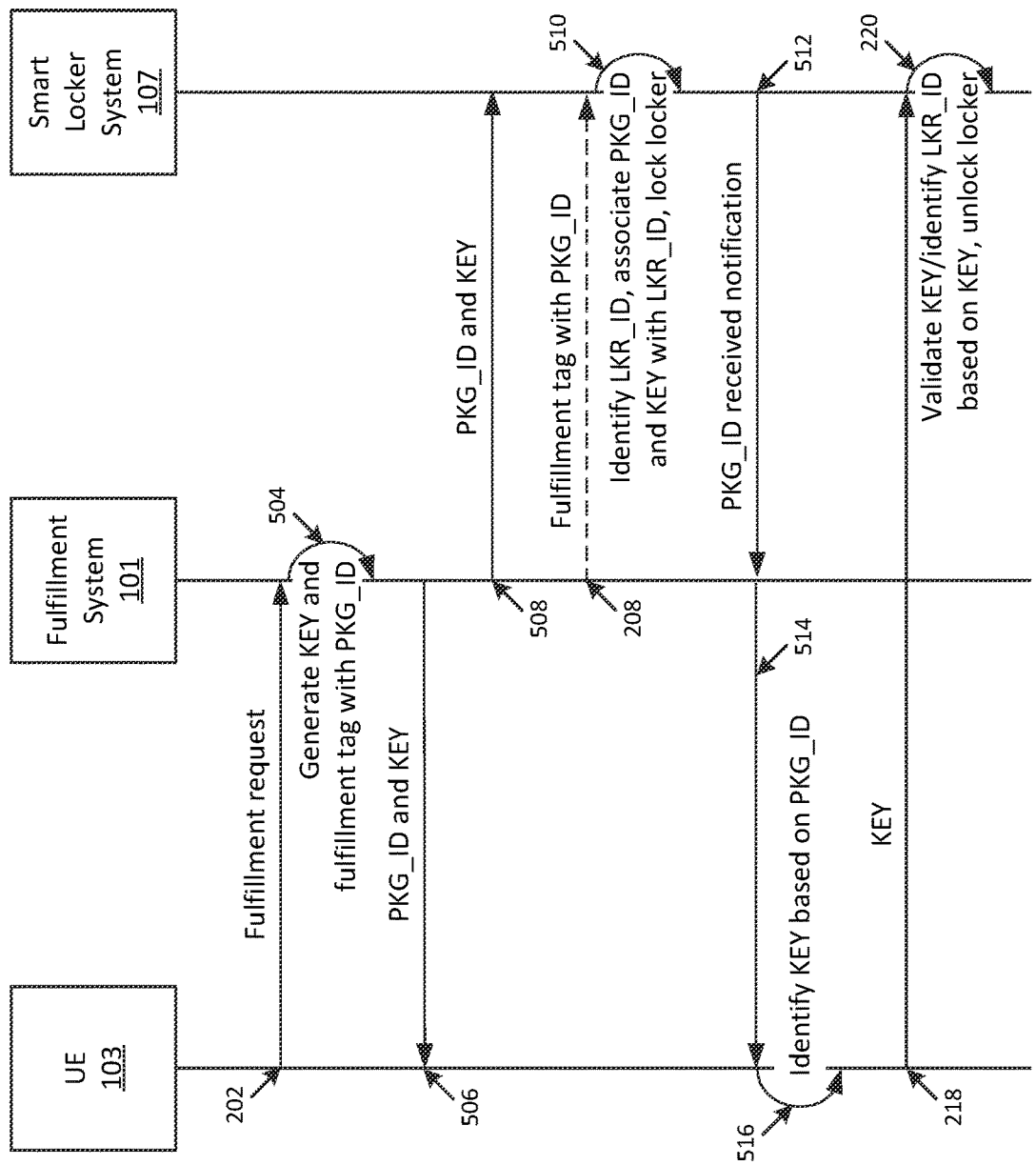

FIG. 5 illustrates another example of the secure delivery to, and retrieval from, smart locker system 107 in response to a fulfillment request, in accordance with some embodiments. As shown, UE 103 may output (at 202) a fulfillment request to fulfillment system 101, as similarly described above. Fulfillment system 101 may generate (at 504) a KEY associated with the fulfillment request. For example, as similarly discussed above, fulfillment system 101 may generate an asymmetric key pair, a passphrase, and/or initiate some other suitable authentication mechanism. Fulfillment system 101 may further generate a fulfillment tag with a PKG_ID associated with a package used to satisfy the fulfillment request.

Fulfillment system 101 may output (at 506) the PKG_ID and the KEY to UE 103. For example, fulfillment system 101 may provide the PKG_ID and the KEY to UE 103 via an API, an application, a text message, an email, and/or some other suitable communication pathway. UE 103 may store the PKG_ID and/or KEY in a local storage device, which may include a SIM ("Subscriber Identification Module") card, a Universal Integrated Circuit Card ("UICC"), and/or some other type of secure storage. Fulfillment system 101 may further provide (at 508) the PKG_ID and KEY to smart locker system 107. As similarly described above, providing the KEY to UE 103 and to smart locker system 107 may include providing (at 506) a private key of an asymmetric key pair to UE 103 and providing (at 508) an authentication token and/or some other type of information that was encrypted using a public key of the asymmetric key pair to smart locker system 107.

Fulfillment system 101 may further output (at 208) the package with the fulfillment tag, including the PKG_ID, to smart locker system 107, in a manner similarly described above (e.g., in a particular locker 301 of smart locker system 107). In some embodiments, in lieu of fulfillment system 101 generating (at 504) and providing (at 508) a KEY to smart locker system 107, smart locker system 107 may generate a KEY when the package is received. In some embodiments, the KEY may be generated using a particular seed and/or some other "offline" mechanism, in which smart locker system 107 need not have network connectivity or otherwise communication with fulfillment system 101. In some embodiments, the app clip, instant app, etc. that may be utilized by UE 103 (e.g., as discussed above) may be configured with the same seed, such that UE 103 may receive the KEY (e.g., a private key associated with an asymmetric key pair which may be generated or selected by smart locker system 107 based on the seed) from the app clip, instant app, etc.

Smart locker system 107 may identify (at 510) a LKR_ID of locker 301 in which the package was placed, may associate the PKG_ID with the LKR_ID, and may further lock the locker in a manner similarly described above. Smart locker system 107 may further identify the previously received (e.g., at 508) KEY based on PKG_ID, and may further associate the identified KEY with the LKR_ID. Smart locker system 107 may output (at 512) a notification that the package, having the PKG_ID, was received and fulfillment system 101 may output (at 514) a notification to UE 103 that package 105 associated with the fulfillment request has been received at smart locker system 107. In some embodiments, smart locker system 107 may not output (at 512) a PKG_ID received notification, and fulfillment system 101 may and/or UE 103 may determine in some other way that the package has been delivered. For example, an external tracking system (e.g., associated with a shipper, courier, or the like) may indicate that the package has been delivered. In this manner, smart locker system 107 may not need to communicate with fulfillment system 101 to indicate that the package has been delivered (e.g., in situations where smart locker system 107 does not have network connectivity and/or otherwise does not communicate with fulfillment system 101). In some embodiments, fulfillment system 101 may further notify (e.g., at 514, in response to receiving the fulfillment request at 202, and/or at some other time) UE 103 of a geographical location of smart locker system 107 (e.g., an address, latitude and longitude coordinates, Global Positioning System ("GPS") coordinates, etc.).

UE 103 may identify (at 516) that the previously received (at 516) KEY is associated with the notification (received at 514). For example, UE 103 may identify (at 516) the KEY based on an indication from a user of UE 103 that the user is ready to pick up the package from smart locker system 107. Additionally, or alternatively, UE 103 may automatically identify (at 516) the KEY based on monitoring a location of UE 103 (e.g., using a GPS location determination technique, based on a network-implemented UE location determination technique, and/or some other suitable location determination technique) and determining that the geographical location is within a threshold proximity of smart locker system 107. For example, as noted above, UE 103 may have previously received location information associated with smart locker system 107. Additionally, or alternatively, an NFC component, a BLE component, and/or some other sort of wireless communication component of UE 103 may detect the presence of tag reader 305-11, associated with locker control system 307 of smart locker system 107, and may identify that the KEY has been received (at 514) based on detecting that UE 103 is within a threshold proximity of smart locker system 107. UE 103 may further provide (at 218) the KEY to smart locker system 107, and smart locker system 107 may validate (at 220) the KEY, identify a LKR_ID associated with a locker 301 in which the package is located, and may unlock locker 301 based on validating the KEY. As noted above, operation 218 in FIG. 5 may include some or all of the operations described above with respect to FIG. 2B (e.g., the obtaining and/or use of an app clip, instant app, application, etc. to authenticate UE 103 and/or a user thereof).

Figure 6:
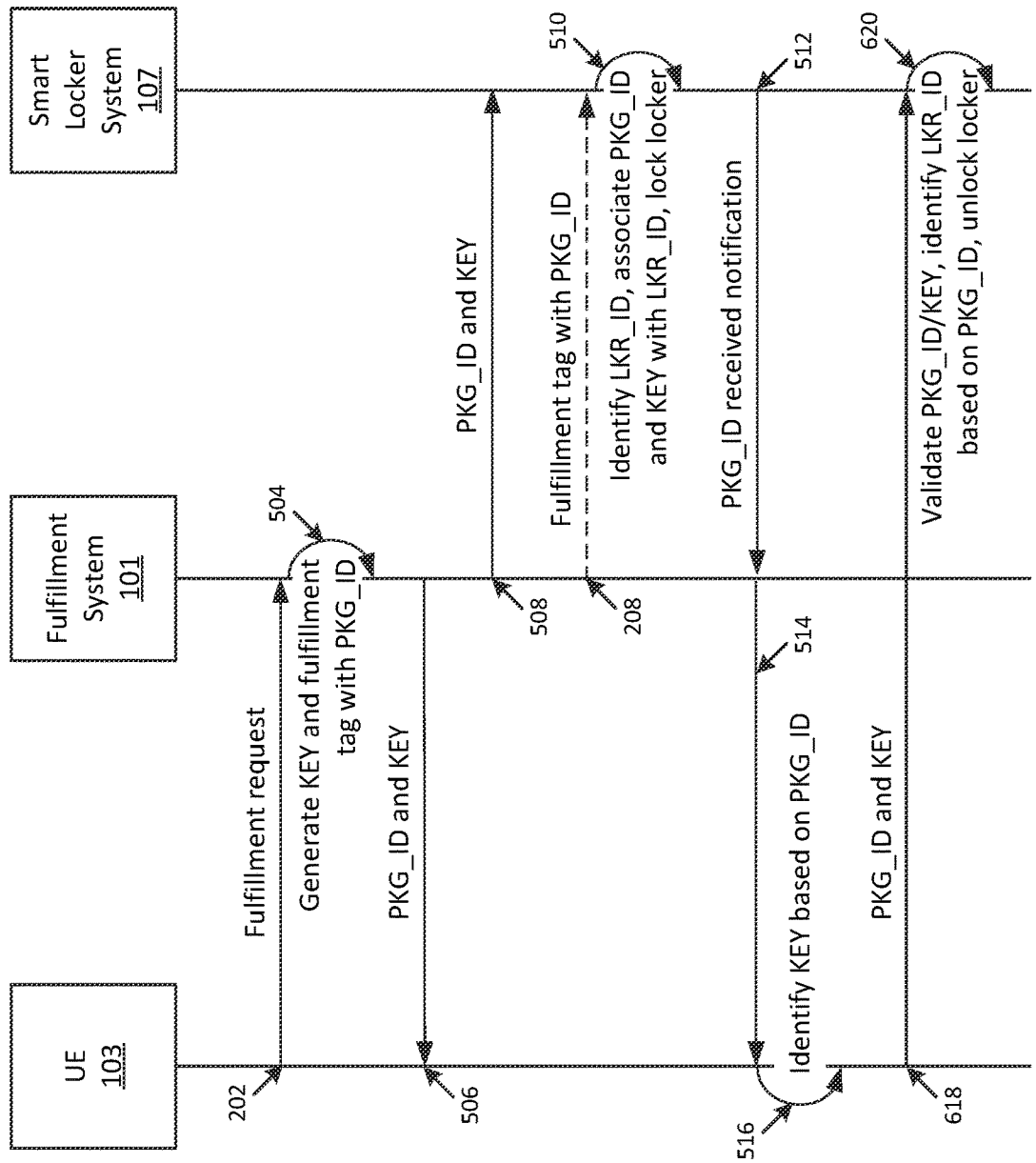

FIG. 6 illustrates another example of the secure delivery to, and retrieval from, smart locker system 107 in response to a fulfillment request, in accordance with some embodiments. Similar to the operations of FIGS. 2A, 4, and/or 5 with the same reference numerals, UE 103 may output (at 202) a fulfillment request to fulfillment system 101. Fulfillment system 101 may generate (at 504) a KEY and a fulfillment tag with an appropriate PKG_ID, output (at 506) the PKG_ID and KEY to UE 103, output (at 508) the PKG_ID and KEY to smart locker system 107, and provide (at 208) the fulfillment tag and PKG_ID to smart locker system 107. Smart locker system 107 may identify (at 510) a LKR_ID associated with the received package 105, associate the KEY and the PKG_ID with the LKR_ID, and lock locker 301 in which package 105 was placed. Smart locker system 107 may output (at 512) a PKG_ID received notification to fulfillment system 101, which may output (at 514) a PKG_ID received notification to UE 103. UE 103 may further identify (at 516) the previously received KEY based on the PKG_ID.

UE 103 may further output (at 618) the PKG_ID and KEY to smart locker system 107. Smart locker system 107 may validate (at 620) the PKG_ID and the KEY, such as by verifying that the KEY matches the KEY that was previously received (at 508) in conjunction with the PKG_ID. Additionally, or alternatively, as similarly described above, smart locker system 107 may validate the KEY in one or more other suitable ways, such as by identifying that the KEY (provided by UE 103 at 618) is able to decrypt an authentication token that was encrypted using a public key of an asymmetric key pair with which the KEY is associated with (e.g., where the KEY may be or may include a private key of the asymmetric key pair).

Figure 7:
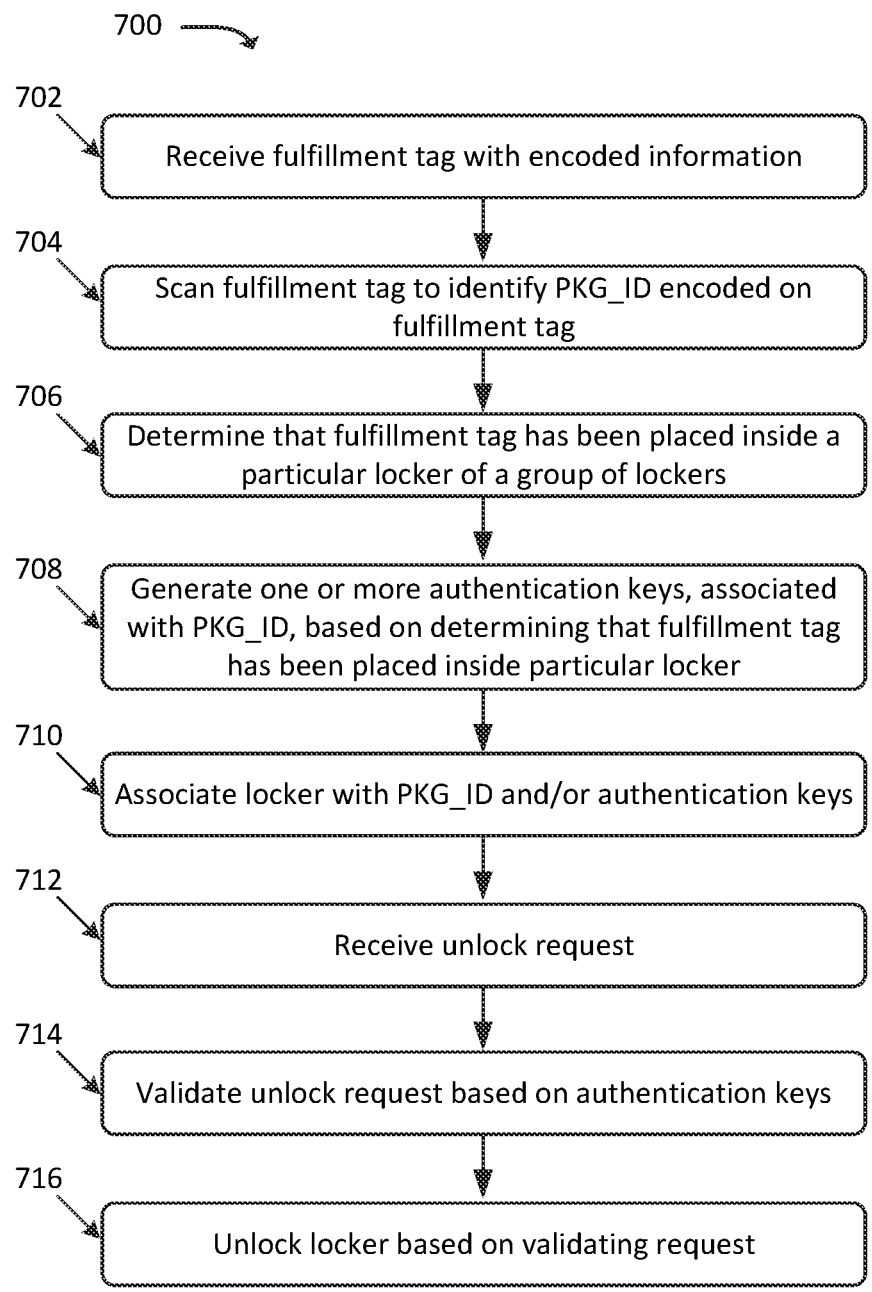
FIG. 7 illustrates an example process for the secure delivery to, and retrieval from, a smart locker system in response to a fulfillment request, in accordance with some embodiments.

FIG. 7 illustrates an example process 700 for the secure delivery to, and retrieval from, smart locker system 107 in response to a fulfillment request, in accordance with some embodiments. In some embodiments, some or all of process 700 may be performed by smart locker system 107. In some embodiments, one or more other devices may perform some or all of process 700 (e.g., in concert with, and/or in lieu of, smart locker system 107, such as fulfillment system 101, authentication relay system 201, and/or one or more other devices or systems).

As shown, process 700 may include receiving (at 702) a fulfillment tag with encoded information. For example, as discussed above, smart locker system 107 may receive (e.g., in a particular locker 301 of a set of lockers 301 associated with smart locker system 107) a particular fulfillment tag 311, which may be placed inside or affixed to package 105. As discussed above, package 105 may include one or more goods, items, etc. that are provided based on a fulfillment request from UE 103. In some embodiments, fulfillment tag 311 may include an identifier associated with the fulfillment request and/or with package 105, which may include an order number, a tracking number, and/or some other unique identifier (referred to herein as a "PKG_ID") associated with the fulfillment request and/or package 105. The identifier may be encoded on fulfillment tag 311, such as encoded on an NFC tag, a BLE beacon, or some other sort of device or system or encoded object that is capable of being scanned via RF transmissions. In some embodiments, the identifier may be encoded as a graphic, visual image, pattern, string, etc. on an exterior of package 105.

Process 700 may further include scanning (at 704) the fulfillment tag to identify the PKG_ID encoded on the fulfillment tag. For example, smart locker system 107 may, via tag reader 305 (e.g., a particular tag reader 305 associated with a particular locker 301, where different lockers 301 may be associated with different tag readers 305), identify the PKG_ID associated with package 105 when package 105 is placed inside a particular locker 301.

Process 700 may additionally include determining (at 706) that the fulfillment tag has been placed inside a particular locker 301 of a group of lockers 301 associated with smart locker system 107. For example, smart locker system 107 may identify which tag reader 305, of a set of tag readers 305 that are each associated with a respective locker 301, scanned (at 704) fulfillment tag 311. In some embodiments, smart locker system 107 identify the particular locker 301 based on receiving sensor information, such as information measured by a scale associated with locker 301, via which smart locker system 107 may determine that a weight reported by the scale exceeds a threshold weight, and/or that the weight has changed by at least a threshold amount, thus indicating that placement of package 105 inside locker 301. In some embodiments, smart locker system 107 may determine that package 105 was placed in the particular locker 301 based on image detection techniques, motion sensor information, and/or other suitable sensor information.

Process 700 may also include generating (at 708) one or more authentication keys, associated with the particular fulfillment tag 311 (e.g., associated with the particular PKG_ID), based on determining that fulfillment tag 311 has been placed inside the particular locker 301. For example, as discussed above, smart locker system 107 may generate an authentication key or set of authentication keys (e.g., an asymmetric key pair and/or some other set of authentication keys) associated with fulfillment tag 311. Smart locker system 107 may output at least a portion of the set of authentication keys to UE 103 (and/or to one or more devices or systems that forwards such information to UE 103, such as fulfillment system 101, authentication relay system 201, a blockchain system, and/or one or more other devices or systems). For example, smart locker system 107 may output a private key and/or a public key of the asymmetric key pair to UE 103, and may retain at least the public key. In some embodiments, smart locker system 107 may request that another devices or systems create an asymmetric key pair, and the other device or system may provide the private key and/or the public key to UE 103, and may provide only the public key (e.g., not the private key) to smart locker system 107. In some embodiments, the public key and the private key may both be provided to smart locker system 107.

Process 700 may further include associating (at 710) fulfillment tag 311 (e.g., the PKG_ID) with at least a portion of the generated authentication keys. For example, smart locker system 107 may maintain the public key as being associated with the PKG_ID. In some embodiments, smart locker system 107 may maintain the public key and the private key as being associated with the PKG_ID. In some embodiments, smart locker system 107 may otherwise maintain information, associated with the generated authentication key or keys, as being associated with the PKG_ID.

Process 700 may additionally include receiving (at 712) an unlock request. For example, smart locker system 107 may receive an NFC tap, sense a BLE communication, and/or receive some other form of wireless communication that may be sensed when UE 103 is within wireless communication range of smart locker system 107. In some embodiments, smart locker system 107 may include an optical scanner that visually detects a QR code or other graphical information presented on UE 103 to initiate the unlock request. In some embodiments, such QR code or other visual information may include and/or may be generated based on the private key or other suitable authentication information.

Process 700 may also include validating (at 714) the unlock request based on the previously generated one or more authentication keys. For example, smart locker system 107 may verify whether the unlock request includes a previously authorized passphrase or code. Additionally, or alternatively, smart locker system 107 may output, to UE 103 (e.g., via NFC, BLE, and/or some other suitable communication protocol) a challenge, such as a string, code, etc. that has been encrypted with the public key, UE 103 may decrypt the encrypted challenge to extract an decrypted version of the challenge, and may provide the decrypted challenge to smart locker system 107. Smart locker system 107 may validate the unlock request when the decrypted challenged, received from UE 103, matches the original challenge prior to the encryption. In some embodiments, smart locker system 107 may validate the unlock request using any other suitable authentication mechanism.

Process 700 may further include unlocking (at 716) locker 301 based on validating the unlock request. For example, smart locker system 107 may output, to lock 303 associated with locker 301, a command or instruction to unlock, thus allowing a user of UE 103 to retrieve package 105 from locker 301. In some embodiments, smart locker system 107 may present a LKR_ID associated with locker 301 via a display screen of smart locker system 107, a speaker of smart locker system 107, or some other component of smart locker system 107. In some embodiments, smart locker system 107 may provide (e.g., via NFC, BLE, or some other suitable communication pathway) the LKR_ID to UE 103, such that UE 103 may present the LKR_ID to a user of UE 103.

Figure 8:
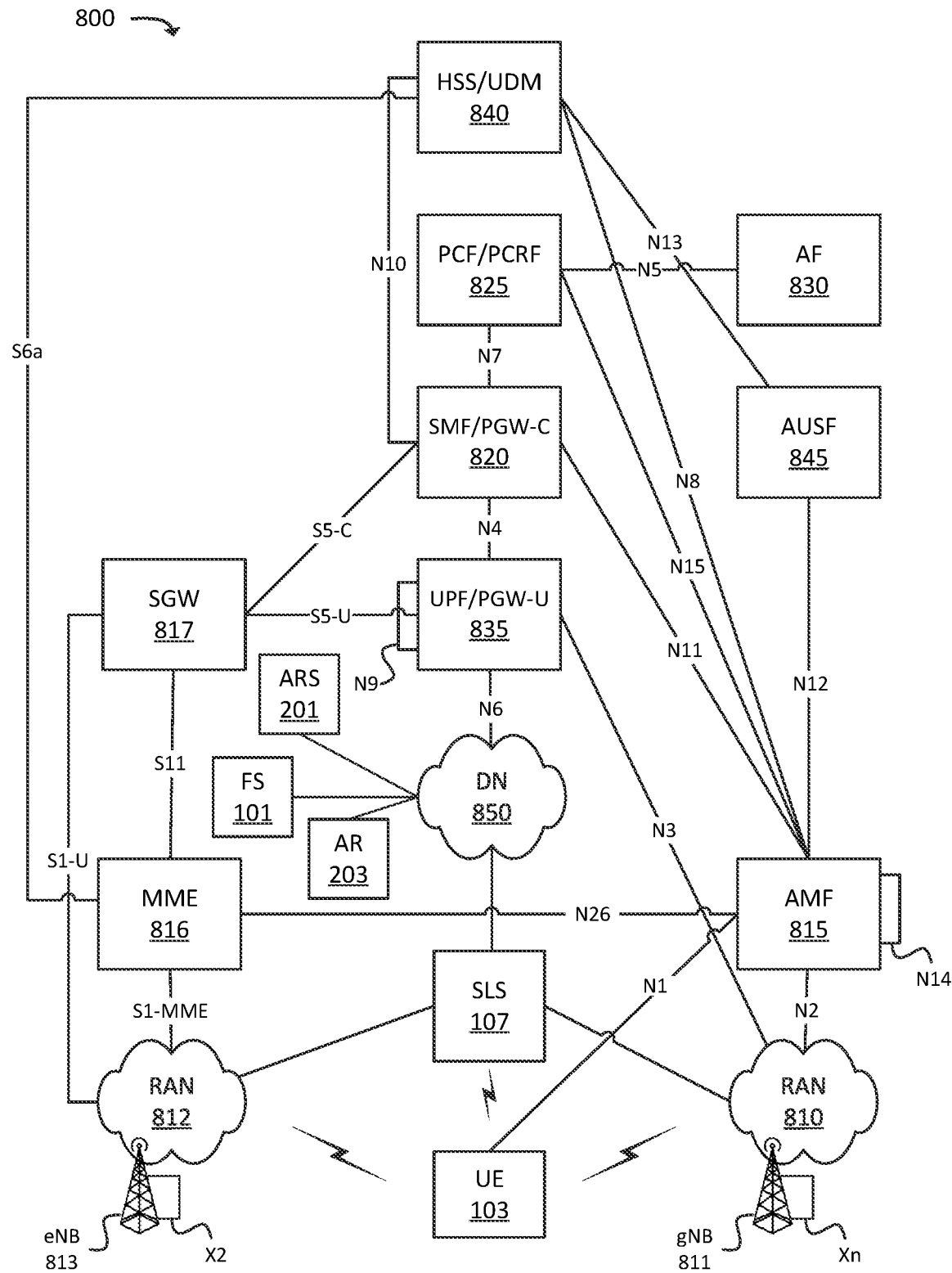
FIG. 8 illustrates an example environment in which one or more embodiments, described herein, may be implemented.

FIG. 8 illustrates an example environment 800, in which one or more embodiments may be implemented. In some embodiments, environment 800 may correspond to a 5G network, and/or may include elements of a 5G network. In some embodiments, environment 800 may correspond to a 5G Non-Standalone ("NSA") architecture, in which a 5G radio access technology ("RAT") may be used in conjunction with one or more other RATs (e.g., an LTE RAT), and/or in which elements of a 5G core network may be implemented by, may be communicatively coupled with, and/or may include elements of another type of core network (e.g., an evolved packet core ("EPC")). As shown, environment 800 may include UE 103, RAN 810 (which may include one or more Next Generation Node Bs ("gNBs") 811), RAN 812 (which may include one or more one or more evolved Node Bs ("eNBs") 813), and various network functions such as Access and Mobility Management Function ("AMF") 815, Mobility Management Entity ("MME") 816, Serving Gateway ("SGW") 817, Session Management Function ("SMF")/Packet Data Network ("PDN") Gateway ("PGW")-Control plane function ("PGW-C") 820, Policy Control Function ("PCF")/Policy Charging and Rules Function ("PCRF") 825, Application Function ("AF") 830, User Plane Function ("UPF")/PGW-User plane function ("PGW-U") 835, Home Subscriber Server ("HSS")/Unified Data Management ("UDM") 840, and Authentication Server Function ("AUSF") 845. Environment 800 may also include one or more networks, such as Data Network ("DN") 850. Environment 800 may include one or more additional devices or systems communicatively coupled to one or more networks (e.g., DN 850), such as fulfillment system 101, smart locker system 107, and/or authentication relay system 201, which may perform operations as described above.

The example shown in FIG. 8 illustrates one instance of each network component or function (e.g., one instance of SMF/PGW-C 820, PCF/PCRF 825, UPF/PGW-U 835, HSS/UDM 840, and/or AUSF 845). In practice, environment 800 may include multiple instances of such components or functions. For example, in some embodiments, environment 800 may include multiple "slices" of a core network, where each slice includes a discrete set of network functions (e.g., one slice may include a first instance of SMF/PGW-C 820, PCF/PCRF 825, UPF/PGW-U 835, HSS/UDM 840, and/or AUSF 845, while another slice may include a second instance of SMF/PGW-C 820, PCF/PCRF 825, UPF/PGW-U 835, HSS/UDM 840, and/or 845). The different slices may provide differentiated levels of service, such as service in accordance with different Quality of Service ("QoS") parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. Alternatively, or additionally, one or more of the devices of environment 800 may perform one or more network functions described as being performed by another one or more of the devices of environment 800. Devices of environment 800 may interconnect with each other and/or other devices via wired connections, wireless connections, or a combination of wired and wireless connections. In some implementations, one or more devices of environment 800 may be physically integrated in, and/or may be physically attached to, one or more other devices of environment 800.

UE 103 may include a computation and communication device, such as a wireless mobile communication device that is capable of communicating with RAN 810, RAN 812, and/or DN 850. UE 103 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 103 may send traffic to and/or receive traffic (e.g., user plane traffic) from DN 850 via RAN 810, RAN 812, and/or UPF/PGW-U 835.

RAN 810 may be, or may include, a 5G RAN that includes one or more base stations (e.g., one or more gNBs 811), via which UE 103 may communicate with one or more other elements of environment 800. UE 103 may communicate with RAN 810 via an air interface (e.g., as provided by gNB 811). For instance, RAN 810 may receive traffic (e.g., voice call traffic, data traffic, messaging traffic, signaling traffic, etc.) from UE 103 via the air interface, and may communicate the traffic to UPF/PGW-U 835, and/or one or more other devices or networks. Similarly, RAN 810 may receive traffic intended for UE 103 (e.g., from UPF/PGW-U 835, AMF 815, and/or one or more other devices or networks) and may communicate the traffic to UE 103 via the air interface.

RAN 812 may be, or may include, a LTE RAN that includes one or more base stations (e.g., one or more eNBs 813), via which UE 103 may communicate with one or more other elements of environment 800. UE 103 may communicate with RAN 812 via an air interface (e.g., as provided by eNB 813). For instance, RAN 810 may receive traffic (e.g., voice call traffic, data traffic, messaging traffic, signaling traffic, etc.) from UE 103 via the air interface, and may communicate the traffic to UPF/PGW-U 835, and/or one or more other devices or networks. Similarly, RAN 810 may receive traffic intended for UE 103 (e.g., from UPF/PGW-U 835, SGW 817, and/or one or more other devices or networks) and may communicate the traffic to UE 103 via the air interface.

AMF 815 may include one or more devices, systems, Virtualized Network Functions ("VNFs"), etc., that perform operations to register UE 103 with the 5G network, to establish bearer channels associated with a session with UE 103, to hand off UE 103 from the 5G network to another network, to hand off UE 103 from the other network to the 5G network, manage mobility of UE 103 between RANs 810 and/or gNBs 811, and/or to perform other operations. In some embodiments, the 5G network may include multiple AMFs 815, which communicate with each other via the N14 interface (denoted in FIG. 8 by the line marked "N14" originating and terminating at AMF 815).

MME 816 may include one or more devices, systems, VNFs, etc., that perform operations to register UE 103 with the EPC, to establish bearer channels associated with a session with UE 103, to hand off UE 103 from the EPC to another network, to hand off UE 103 from another network to the EPC, manage mobility of UE 103 between RANs 812 and/or eNBs 813, and/or to perform other operations.

SGW 817 may include one or more devices, systems, VNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, etc., that gather, process, store, and/or provide information in a manner described herein. SMF/PGW-C 820 may, for example, facilitate the establishment of communication sessions on behalf of UE 103. In some embodiments, the establishment of communications sessions may be performed in accordance with one or more policies provided by PCF/PCRF 825.

PCF/PCRF 825 may include one or more devices, systems, VNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, etc., that receive, store, and/or provide information that may be used in determining parameters (e.g., quality of service parameters, charging parameters, or the like) for certain applications.

UPF/PGW-U 835 may include one or more devices, systems, VNFs, etc., that receive, store, and/or provide data (e.g., user plane data). For example, UPF/PGW-U 835 may receive user plane data (e.g., voice call traffic, data traffic, etc.), destined for UE 103, from DN 850, and may forward the user plane data toward UE 103 (e.g., via RAN 810, SMF/PGW-C 820, and/or one or more other devices). In some embodiments, multiple UPFs 835 may be deployed (e.g., in different geographical locations), and the delivery of content to UE 103 may be coordinated via the N9 interface (e.g., as denoted in FIG. 8 by the line marked "N9" originating and terminating at UPF/PGW-U 835). Similarly, UPF/PGW-U 835 may receive traffic from UE 103 (e.g., via RAN 810, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

HSS/UDM 840 and AUSF 845 may include one or more devices, systems, VNFs, etc., that manage, update, and/or store, in one or more memory devices associated with AUSF 845 and/or HSS/UDM 840, profile information associated with a subscriber. AUSF 845 and/or HSS/UDM 840 may perform authentication, authorization, and/or accounting operations associated with the subscriber and/or a communication session with UE 103.

DN 850 may include one or more wired and/or wireless networks. For example, DN 850 may include an Internet Protocol ("IP")-based PDN, a wide area network ("WAN") such as the Internet, a private enterprise network, and/or one or more other networks. UE 103 may communicate, through DN 850, with data servers, other UEs 103, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 103 may communicate.

Figure 9:
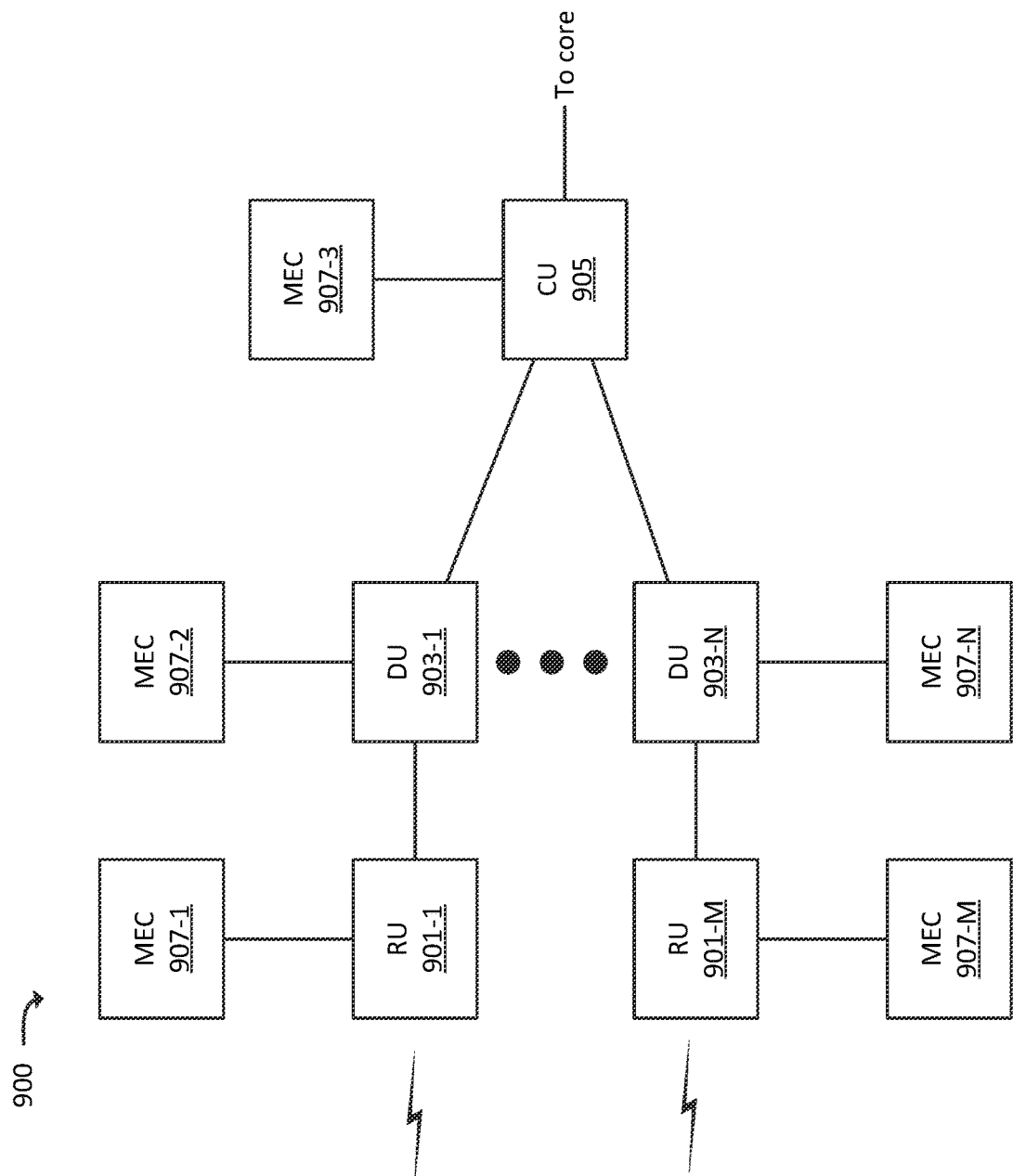
FIG. 9 illustrates an example arrangement of a radio access network ("RAN"), in accordance with some embodiments.

FIG. 9 illustrates an example Distributed Unit ("DU") network 900, which may be included in and/or implemented by one or more RANs (e.g., RAN 810, RAN 812, or some other RAN). In some embodiments, a particular RAN may include one DU network 900. In some embodiments, a particular RAN may include multiple DU networks 900. In some embodiments, DU network 900 may correspond to a particular gNB 811 of a 5G RAN (e.g., RAN 810). In some embodiments, DU network 900 may correspond to multiple gNBs 811. In some embodiments, DU network 900 may correspond to one or more other types of base stations of one or more other types of RANs. As shown, DU network 900 may include Central Unit ("CU") 905, one or more Distributed Units ("DUs") 903-1 through 903-N (referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 815 and/or UPF/PGW-U 835). In the uplink direction (e.g., for traffic from UEs 103 to a core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based on the RLC packets) on the traffic received from DUs 903.

In accordance with some embodiments, CU 905 may receive downlink traffic (e.g., traffic from the core network) for a particular UE 103, and may determine which DU(s) 903 should receive the downlink traffic. DU 903 may include one or more devices that transmit traffic between a core network (e.g., via CU 905) and UE 103 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 103.

RU 901 may include hardware circuitry (e.g., one or more RF transceivers, antennas, radios, and/or other suitable hardware) to communicate wirelessly (e.g., via an RF interface) with one or more UEs 103, one or more other DUs 903 (e.g., via RUs 901 associated with DUs 903), and/or any other suitable type of device. In the uplink direction, RU 901 may receive traffic from UE 103 and/or another DU 903 via the RF interface and may provide the traffic to DU 903. In the downlink direction, RU 901 may receive traffic from DU 903, and may provide the traffic to UE 103 and/or another DU 903.

RUs 901 may, in some embodiments, be communicatively coupled to one or more Multi-Access/Mobile Edge Computing ("MEC") devices, referred to sometimes herein simply as "MECs" 907. For example, RU 901-1 may be communicatively coupled to MEC 907-1, RU 901-M may be communicatively coupled to MEC 907-M, DU 903-1 may be communicatively coupled to MEC 907-2, DU 903-N may be communicatively coupled to MEC 907-N, CU 905 may be communicatively coupled to MEC 907-3, and so on. MECs 907 may include hardware resources (e.g., configurable or provisionable hardware resources) that may be configured to provide services and/or otherwise process traffic to and/or from UE 103, via a respective RU 901.

For example, RU 901-1 may route some traffic, from UE 103, to MEC 907-1 instead of to a core network (e.g., via DU 903 and CU 905). MEC 907-1 may process the traffic, perform one or more computations based on the received traffic, and may provide traffic to UE 103 via RU 901-1. In this manner, ultra-low latency services may be provided to UE 103, as traffic does not need to traverse DU 903, CU 905, and an intervening backhaul network between DU network 900 and the core network. In some embodiments, MEC 907 may include, and/or may implement, some or all of the functionality described above with respect to fulfillment system 101, smart locker system 107, and/or authentication relay system 201.

Figure 10:
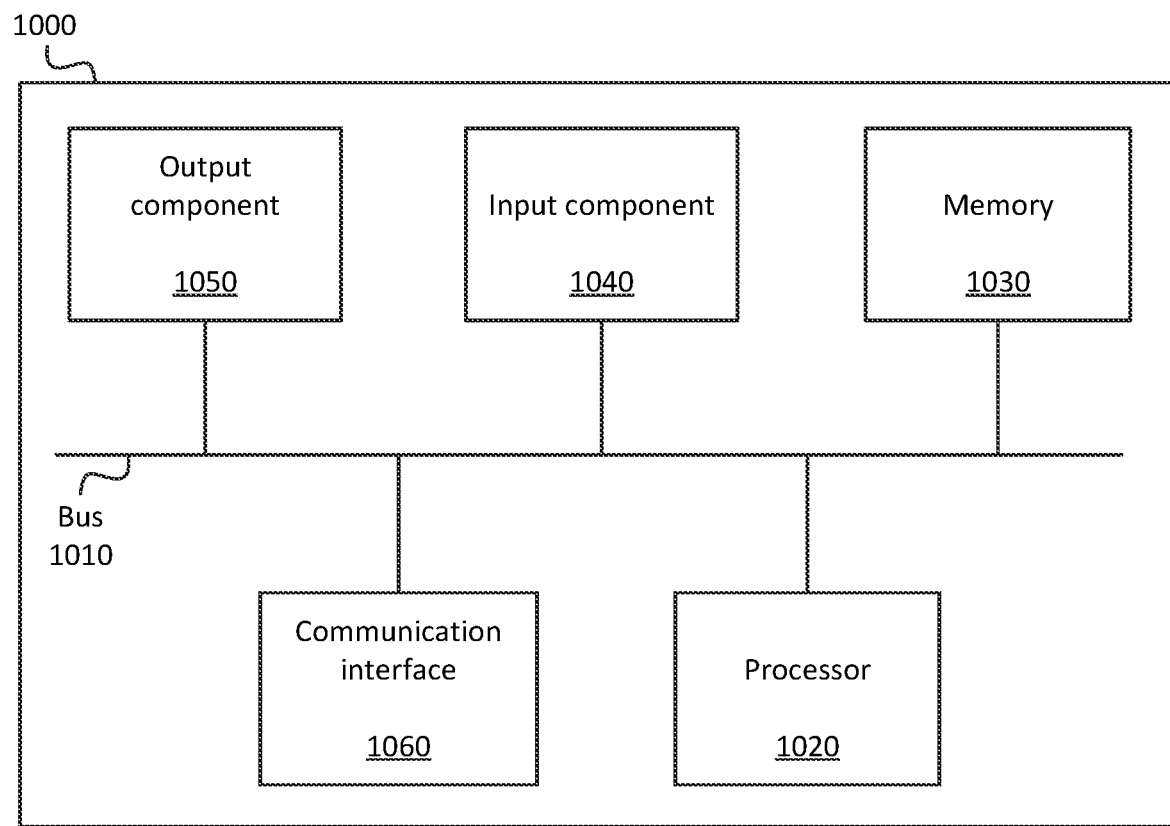
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1, 2A, 2B, and 3-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
identify a particular identifier encoded on a fulfillment tag by wirelessly scanning the fulfillment tag that is encoded with the particular identifier;
determine that the fulfillment tag was placed inside a particular locker, of a plurality of lockers, wherein the locker is locked based on placement of the fulfillment tag inside the particular locker;
generate one or more authentication keys, associated with the particular identifier, based on determining that the fulfillment tag was placed inside the particular locker;
output a notification that the fulfillment tag, on which the particular identifier was encoded, has been received;
output at least one of the one or more authentication keys to an authentication system;
receive an unlock request from a User Equipment ("UE");
output, to the UE based on receiving the unlock request, an indication of a particular application, wherein the UE executes the particular application to communicate with the authentication system, wherein the authentication system:
authenticates the UE and verifies that the UE is associated with the particular identifier; and
outputs the at least one authentication key to the UE based on authenticating the UE and verifying that the UE is associated with the particular identifier;
receive the at least one authentication key from the UE after the UE receives the at least one authentication key from the authentication system; and
unlock the particular locker based on receiving the at least one authentication key from the particular UE.

2. The device of claim 1, wherein the one or more processors are further configured to:
output, based on the unlock request, encrypted challenge information; and
receive a challenge response in response to the encrypted challenge information,
wherein unlocking the particular locker includes validating that the challenge response includes a decrypted version of the encrypted challenge information.

3. The device of claim 1, wherein the one or more authentication keys include a public key of an asymmetric key pair and a private key of the asymmetric key pair, and wherein the at least one authentication key is based on the private key of the asymmetric key pair.

4. The device of claim 3, wherein validating that the unlock request is associated with the at least one authentication key includes identifying that encrypted authentication information, encrypted using the public key, is able to be decrypted by the private key associated with the unlock request.

5. The device of claim 1, wherein the fulfillment tag includes a Near Field Communication ("NFC") tag, and wherein wirelessly scanning the fulfillment tag includes wirelessly scanning the NFC tag with an NFC reader.

6. The device of claim 1, wherein the particular identifier is a first identifier, wherein the fulfillment tag is a first fulfillment tag, and wherein the particular locker is a first locker, wherein the one or more authentication keys are a first set of authentication keys, wherein the one or more processors are further configured to:
    identify a second identifier encoded on a second fulfillment tag by wirelessly scanning the second fulfillment tag that is encoded with the second identifier;
    determine that the second fulfillment tag was placed inside a second locker, of the plurality of lockers; and
    generate a second set of authentication keys, associated with the second identifier, based on determining that the second fulfillment tag was placed inside the second locker,
        wherein the second set of authentication keys is different from the first set of authentication keys.

7. The device of claim 1, wherein the identifier is encoded on the fulfillment tag by a fulfillment center in response to a fulfillment request received by the fulfillment center, wherein the generating of the one or more authentication keys and the validating of the unlock request are not performed by the fulfillment center.

8. A non-transitory computer-readable medium, storing a plurality of processor-executable instructions to:
    identify a particular identifier encoded on a fulfillment tag by wirelessly scanning the fulfillment tag that is encoded with the particular identifier;
    determine that the fulfillment tag was placed inside a particular locker, of a plurality of lockers, wherein the locker is locked based on placement of the fulfillment tag inside the particular locker;
    generate one or more authentication keys, associated with the particular identifier, based on determining that the fulfillment tag was placed inside the particular locker;
    output a notification that the fulfillment tag, on which the particular identifier was encoded, has been received;
    output at least one of the one or more authentication keys to an authentication system;
    receive an unlock request from a User Equipment ("UE");
    output, to the UE based on receiving the unlock request, an indication of a particular application, wherein the UE executes the particular application to communicate with the authentication system, wherein the authentication system:
        authenticates the UE and verifies that the UE is associated with the particular identifier; and
        outputs the at least one authentication key to the UE based on authenticating the UE and verifying that the UE is associated with the particular identifier;
    receive the at least one authentication key from the UE after the UE receives the at least one authentication key from the authentication system; and
    unlock the particular locker based on receiving the at least one authentication key from the particular UE.

9. The non-transitory computer-readable medium of claim 8, wherein the plurality of processor-executable instructions further include processor-executable instructions to:
    output, based on the unlock request, encrypted challenge information; and
    receive a challenge response in response to the encrypted challenge information,
    wherein unlocking the particular locker includes validating that the challenge response includes a decrypted version of the encrypted challenge information.

10. The non-transitory computer-readable medium of claim 8, wherein the one or more authentication keys include a public key of an asymmetric key pair and a private key of the asymmetric key pair, and wherein the at least one authentication key includes the private key of the asymmetric key pair.

11. The non-transitory computer-readable medium of claim 10, wherein validating that the unlock request is associated with the at least one authentication key includes identifying that encrypted authentication information, encrypted using the public key, is able to be decrypted by the private key associated with the unlock request.

12. The non-transitory computer-readable medium of claim 8, wherein the fulfillment tag includes a Near Field Communication ("NFC") tag, and wherein wirelessly scanning the fulfillment tag includes wirelessly scanning the NFC tag with an NFC reader.

13. The non-transitory computer-readable medium of claim 8, wherein the particular identifier is a first identifier, wherein the fulfillment tag is a first fulfillment tag, and wherein the particular locker is a first locker, wherein the one or more authentication keys are a first set of authentication keys, wherein the plurality of processor-executable instructions further include processor-executable instructions to:
    identify a second identifier encoded on a second fulfillment tag by wirelessly scanning the second fulfillment tag that is encoded with the second identifier;
    determine that the second fulfillment tag was placed inside a second locker, of the plurality of lockers; and
    generate a second set of authentication keys, associated with the second identifier, based on determining that the second fulfillment tag was placed inside the second locker,
        wherein the second set of authentication keys is different from the first set of authentication keys.

14. The non-transitory computer-readable medium of claim 8, wherein the identifier is encoded on the fulfillment tag by a fulfillment center in response to a fulfillment request received by the fulfillment center, wherein the generating of the one or more authentication keys and validating of the unlock request are not performed by the fulfillment center.

15. A method, comprising:
    identifying a particular identifier encoded on a fulfillment tag by wirelessly scanning the fulfillment tag that is encoded with the particular identifier;
    determining that the fulfillment tag was placed inside a particular locker, of a plurality of lockers, wherein the locker is locked based on placement of the fulfillment tag inside the particular locker;
    generating one or more authentication keys, associated with the particular identifier, based on determining that the fulfillment tag was placed inside the particular locker;
    outputting a notification that the fulfillment tag, on which the particular identifier was encoded, has been received;
    outputting at least one of the one or more authentication keys to an authentication system;
    receiving an unlock request from a User Equipment ("UE");

outputting, to the UE based on receiving the unlock request, an indication of a particular application, wherein the UE executes the particular application to communicate with the authentication system, wherein the authentication system:
- authenticates the UE and verifies that the UE is associated with the particular identifier; and
- outputs the at least one authentication key to the UE based on authenticating the UE and verifying that the UE is associated with the particular identifier;

receiving the at least one authentication key from the UE after the UE receives the at least one authentication key from the authentication system; and unlocking the particular locker based on receiving the at least one authentication key from the particular UE.

16. The method of claim 15, the method further comprising:
- outputting, based on the unlock request, encrypted challenge information; and
- receiving a challenge response in response to the encrypted challenge information,
- wherein unlocking the particular locker includes validating that the challenge response includes a decrypted version of the encrypted challenge information.

17. The method of claim 15,
- wherein the one or more authentication keys include a public key of an asymmetric key pair and a private key of the asymmetric key pair,
- wherein the at least one authentication key is based on the private key of the asymmetric key pair, and
- wherein validating that the unlock request is associated with the at least one authentication key includes identifying that encrypted authentication information, encrypted using the public key, is able to be decrypted by the private key associated with the unlock request.

18. The method of claim 15, wherein the fulfillment tag includes a Near Field Communication ("NFC") tag, and wherein wirelessly scanning the fulfillment tag includes wirelessly scanning the NFC tag with an NFC reader.

19. The method of claim 15, wherein the particular identifier is a first identifier, wherein the fulfillment tag is a first fulfillment tag, and wherein the particular locker is a first locker, wherein the one or more authentication keys are a first set of authentication keys, the method further comprising:
- identifying a second identifier encoded on a second fulfillment tag by wirelessly scanning the second fulfillment tag that is encoded with the second identifier;
- determining that the second fulfillment tag was placed inside a second locker, of the plurality of lockers; and
- generating a second set of authentication keys, associated with the second identifier, based on determining that the second fulfillment tag was placed inside the second locker,
- wherein the second set of authentication keys is different from the first set of authentication keys.

20. The method of claim 15, wherein the identifier is encoded on the fulfillment tag by a fulfillment center in response to a fulfillment request received by the fulfillment center, wherein the generating of the one or more authentication keys and validating of the unlock request are not performed by the fulfillment center.

* * * * *